United States Patent
Hwang et al.

(10) Patent No.: US 7,570,969 B2
(45) Date of Patent: Aug. 4, 2009

(54) SYSTEM AND METHOD FOR CONTROLLING TRANSMISSION POWER IN WIRELESS LOCAL AREA NETWORK

(75) Inventors: Bo-Seung Hwang, Yongin-si (KR); Myeon-Kee Youn, Incheon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 354 days.

(21) Appl. No.: 11/268,480

(22) Filed: Nov. 8, 2005

(65) Prior Publication Data

US 2006/0120338 A1 Jun. 8, 2006

(30) Foreign Application Priority Data

Dec. 8, 2004 (KR) ...................... 10-2004-0103208

(51) Int. Cl.
*H04B 7/00* (2006.01)
(52) U.S. Cl. ..................... 455/522; 455/69; 370/338
(58) Field of Classification Search ................ 370/338
See application file for complete search history.

(56) References Cited

U.S. PATENT DOCUMENTS

| 5,987,011 | A | 11/1999 | Toh |  |
|---|---|---|---|---|
| 6,859,656 | B2 | 2/2005 | Choi et al. |  |
| 6,898,437 | B1 * | 5/2005 | Larsen et al. | 455/522 |
| 7,346,364 | B1 * | 3/2008 | Tsien et al. | 455/522 |
| 2002/0168993 | A1 * | 11/2002 | Choi et al. | 455/522 |
| 2005/0227724 | A1 * | 10/2005 | Tsai | 455/525 |
| 2006/0148516 | A1 * | 7/2006 | Reddy et al. | 455/552.1 |

FOREIGN PATENT DOCUMENTS

| EP | 1458116 | 9/2004 |
|---|---|---|
| WO | WO 99/07105 | 2/1999 |

OTHER PUBLICATIONS

IEEE, Inc., "IEEE 802.11h: Amendment 5: Spectrum and Transmit Power Management Extensions in the 5 GHz band in Europe", published Oct. 14, 2003.
Perz and Walke, "Adjustable Transmission Power for Mobile Communications with Omnidirectional and Directional Antennas in an One- and Multi-hop Environment", IEEE, May 19, 1991, pp. 630-634.
Chen et al., "Mixed-Mode WLAN: The Integration of Ad Hoc Mode with Wireless LAN Infrastructure", IEEE, Dec. 1, 2003, pp. 231-235.
Biyee, N., European Search Report for European Patent Application No. EP 05026326 dated Mar. 13, 2006.

* cited by examiner

*Primary Examiner*—Rafael Pérez-Gutiérrez
*Assistant Examiner*—German Viana Di Prisco
(74) *Attorney, Agent, or Firm*—Robert E. Bushnell, Esq.

(57) ABSTRACT

Disclosed are a system and method for controlling transmission power in a wireless local area network (WLAN), and more particularly, a system and method for controlling transmission power in a WLAN that are capable of providing a WLAN service to terminals outside a service area by controlling the transmission power in the WLAN. Thus, link margin data of a station positioned at a hidden node of the WLAN is received from another station positioned in a service area, and the received link margin data is compared with preset link margin data for control of the transmission power in the WLAN.

5 Claims, 7 Drawing Sheets

FIG. 5

| Category | Action | Dialog Token | Element ID | Length | Transmit Power | Link margin |

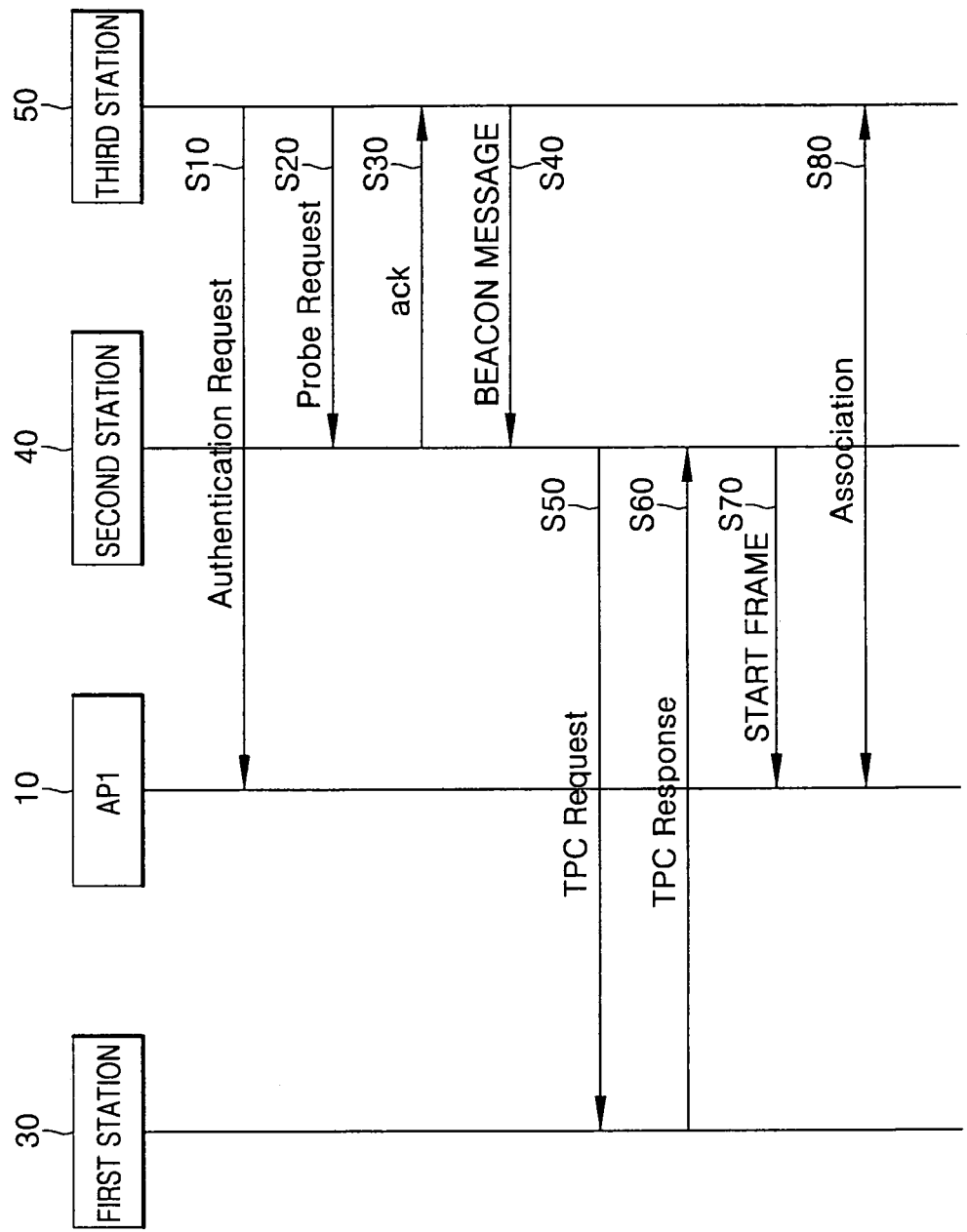

SYSTEM AND METHOD FOR CONTROLLING TRANSMISSION POWER IN WIRELESS LOCAL AREA NETWORK

CLAIM OF PRIORITY

This application makes reference to, incorporates the same herein, and claims all benefits accruing under 35 U.S.C. 1.119 from an application for SYSTEM AND METHOD FOR CONTROLLING TRANSMISSION POWER IN WIRELESS LOCAL AREA NETWORK earlier filed in the Korean Intellectual Property Office on 8 Dec., 2004, and there duly assigned Serial No. 2004-103208.

BACKGROUND OF THE INVENTION

1. Field of the Invention

The present invention relates to a system and method for controlling transmission power in a wireless local area network (WLAN), and more particularly, to a system and method for controlling transmission power in a WLAN, capable of providing WLAN service to terminals outside a service area by controlling the transmission power in the WLAN.

2. Description of the Related Art

A local area network (LAN) may be largely classified into a wired LAN and a wireless LAN. The largest difference between the two LANs is whether or not a cable is present.

In the wireless local area network (WLAN), communication is accomplished using radio waves instead of cable. The WLAN is now emerging as an alternative to overcome difficulties in installation, maintenance, and mobility due to the use of cable. In addition, the increasing mobility of users leads to an increasing need for the WLAN.

The WLAN is composed of an access point (AP) and a WLAN card. The AP is equipment which transmits radio waves so that WLAN users within a transmission distance can access the Internet and use the network. The AP also acts as a base station for cellular phones or a hub for a wired network. Similarly, for wireless high-speed Internet service, which is provided by an Internet service provider (ISP), AP equipment is already disposed in a service area.

For a current WLAN service, a WLAN user should associate with an access point (AP) disposed in a hot-spot region by using a terminal such as a notebook computer with a WLAN card, a personal digital assistant (PDA), or the like. Hereinafter, the wireless LAN terminal is referred to as a station (STA).

IEEE 802.11 is a wireless LAN standard which is widely used today and conforms to "Standard for Information Technology-Telecommunications and Information Exchange between Systems-Local and Metropolitan Area Networks-Specific Requirements-Part 11: Wireless LAN Medium Access Control (MAC) and Physical Layer (PHY) Specifications" 1999 edition.

The IEEE 802.11 standard defines regulations relating to a physical layer and a medium access control (MAC) that constitute the wireless LAN.

The MAC layer defines an order and a rule with which a station or device using a shared medium should comply upon using/accessing the medium, in order to ensure efficient use of the medium capacity.

The WLAN, which is based on 802.11 MAC and IEEE 802.11a/b/g PHY, has been widely used in homes and offices.

In the IEEE 802.11, carrier sense multiple access with collision avoidance (CSMA/CA) is used for competitive occupation of a wireless channel and for communication. At this time, the intensity of radio waves transmitted over a wireless channel should meet a regulatory maximum transmission power (RMTP) requirement of the relevant country. For example, in South Korea, the intensity should not exceed 200 mW per channel. In the United States and Europe, the radio wave intensity is regulated for each frequency band.

However, in Europe, when IEEE 802.11a is used with a 5 GHz band, it is necessary to use transmission power control (TPC) and dynamic frequency selection (DFS) functionalities in order to first protect radar and satellite communications. In order to enact these technology standards, IEEE 802.11h TG is in use.

The TPC is a technique of using only necessary transmission power through control of the transmission power intensity to protect radar and satellite communications. Meanwhile, the DFS is a technique of switching a WLAN channel to another frequency band upon detection of a radar or satellite communication signal, in order to first protect an existing system.

The TPC has advantages in that it is capable of reducing radio wave interference between basic service sets (BSSs), and of efficiently managing a radio wave source, because the TPC is able to dynamically change a service range of a BSS by controlling the output of the AP, in addition to the advantage of protecting radar and satellite communications. In addition, the TPC is capable of reducing battery consumption by reducing the power consumption of stations.

In a system including stations outside a transmission power range of an access point (AP). When stations are positioned in a transmission power range of an AP, the stations may associate with the AP by recognizing their maximum transmission power permitted to transmit in a BSS (basic service set) from beacon information which is received from the AP.

However, a station positioned at a hidden node outside the transmission power range of the AP is unable to correctly receive the beacon information from the AP, which makes it difficult to associate with the AP.

In other words, since the AP is able to receive information from the station outside the transmission power range of the AP, but the transmission power of the AP is insufficient to reach the station outside the transmission power range of the AP, the station outside the transmission power range of the AP does not recognize the AP information. Accordingly, it is difficult to establish a communication link between the AP and the station outside the transmission power range of the AP.

Further, the AP has the disadvantage of high power loss because the AP maintains a certain transmission power all the time.

Incorporated by reference herein are U.S. Pat. No. 5,987,011 to Chai Keong Toh entitled ROUTING METHOD FOR AD-HOC MOBILE NETWORKS which discusses the use of beacons in an ad-hoc mode of communication between mobile stations in a network; and U.S. Pat. No. 6,859,656 to Joon-bo Choi et al. entitled APPARATUS AND METHOD FOR OPTIMIZING TRANSMISSION POWER OF NETWORK which discusses the use of connection information, which includes a reception signal strength and/or link quality information, in a communication unit that sends and receives a data packet through the air, wherein a control unit outputs a control signal for controlling the transmission power according to the connection information of the data packet received through the communication unit.

SUMMARY OF THE INVENTION

It is an object of the present invention to provide a system and method for controlling transmission power in a wireless local area network (WLAN), capable of efficiently controlling transmission power of an access point (AP) so that a station outside a WLAN service area associates with the access point.

According to an aspect of the present invention, there is provided a system for controlling transmission power in a wireless local area network (WLAN), including: an access point for receiving link margin data of a third station positioned at a hidden node of the WLAN from a second station positioned in a service area of the access point, and comparing the received link margin data to preset link margin data to control transmission power in the WLAN.

The access point includes a link margin data comparator for comparing the link margin data of the third station with the preset link margin data; and a transmission power controller for compensating a value of the link margin data of the third station with a value of the preset link margin data to increase the transmission power if the link margin data value of the third station is smaller than the preset link margin data value.

The third station switches its mode from an infrastructure mode to an ad-hoc mode to send a beacon to the second station during a certain time, when failing to associate with the access point.

The second station calculates the link margin data of the third station from average receive rate information in the beacon transferred from the third station and its own link margin data.

The second station adds the link margin data of the third station to a start frame and sends the link margin data to the access point.

According to another aspect of the present invention, there is provided a wireless local area network (WLAN) station, including: a controller for identifying a beacon transferred from an access point of the WLAN and a beacon transferred from a wireless station positioned at a hidden node of the WLAN; and a link margin calculator for calculating link margin data of the wireless station for control of transmission power of the access point, from average receive rate information in the beacon transferred from the wireless station identified by the controller and its own link margin data.

According to yet another aspect of the present invention, there is provided a method for controlling transmission power in a wireless local area network (WLAN), comprising: receiving link margin data of a third station positioned at a hidden node of the WLAN from a second station positioned in a service area and comparing the received link margin data to preset link margin data; and controlling the transmission power in the WLAN based on the comparison result.

Meanwhile, according to yet another aspect of the present invention, there is provided a method for controlling transmission power in a wireless local area network (WLAN), comprising: when a third station positioned outside a service area of an access point fails to associate with the access point, switching its mode from an infrastructure mode to an ad-hoc mode and sending a beacon during a certain time; receiving, by a second station positioned in a WLAN service area, the beacon transferred from the third station to calculate link margin data of the third station; and receiving, by the access point, the calculated link margin data of the third station from the second station, and comparing the calculated link margin data to preset link margin data to determine the transmission power.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 5 illustrates the structure of a TPC start frame according to the present invention;

FIG. 7 is a flow diagram illustrating processes of a method for controlling transmission power in a WLAN according to the present invention.

DETAILED DESCRIPTION OF THE INVENTION

The present invention will now be described more fully with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
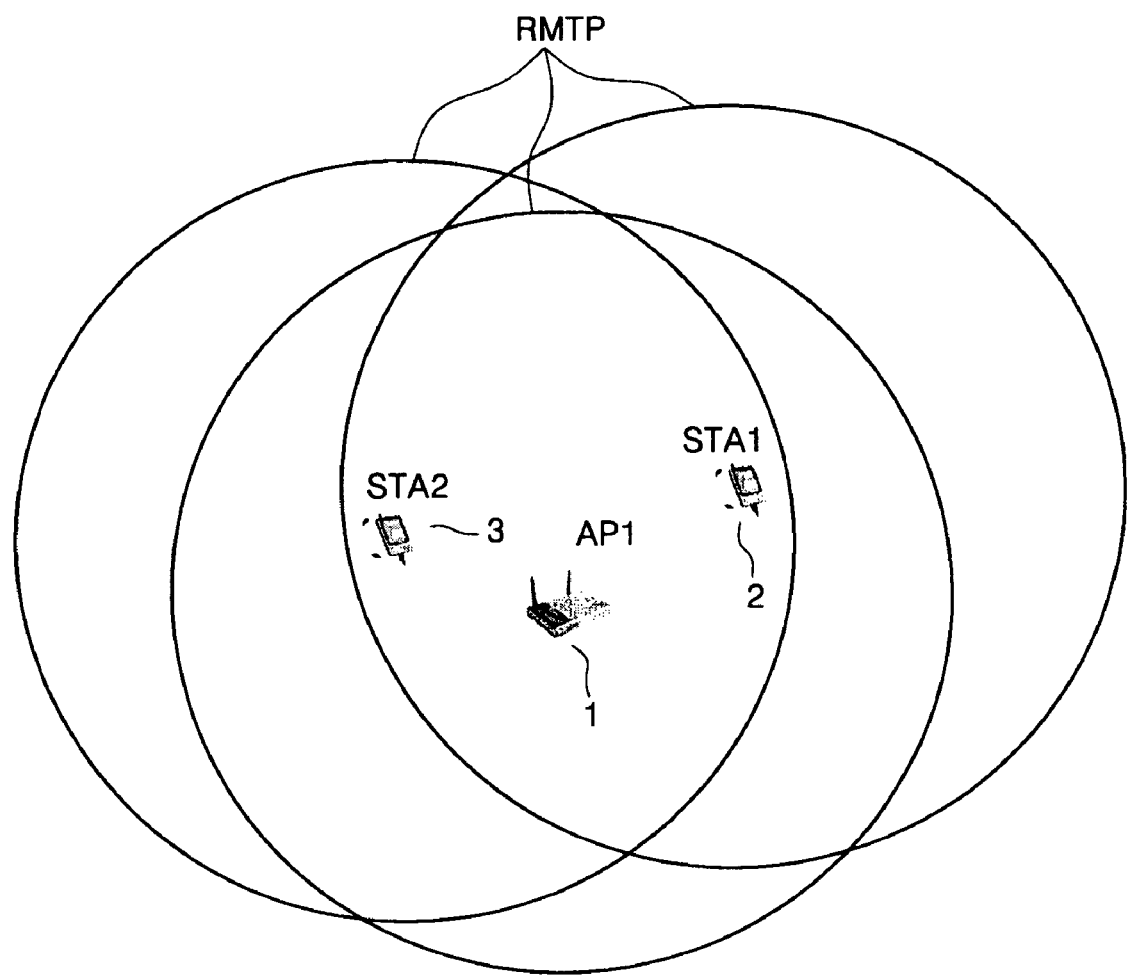
FIG. 1 is a diagram of the configuration of a conventional WLAN system.

FIG. 1 is a diagram of the configuration of a WLAN system. As shown in FIG. 1, transmission powers of an AP1 1, stations STA1 2, and STA2 3 are set within regulatory maximum transmission power (RMTP).

Figure 2:
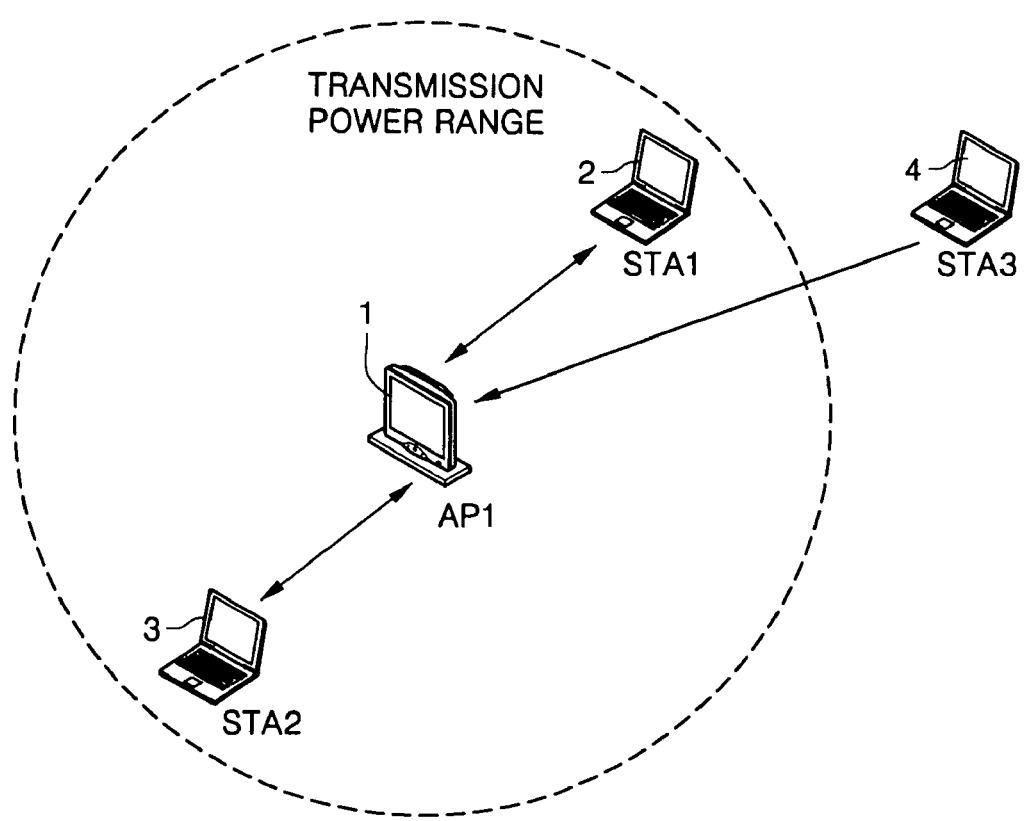
FIG. 2 is a diagram showing the configuration of a system including stations outside a transmission power range of an AP.

FIG. 2 is a diagram showing the configuration of a system including stations outside a transmission power range of an AP. As shown in FIG. 2, since stations STA1 2 and STA2 3 are positioned in a transmission power range of an AP1 1, the stations STA1 2 and STA2 3 may associate with the AP1 1 by recognizing their maximum transmission power permitted to transmit in a BSS from beacon information which is received from the AP.

However, since a station STA3 4 is positioned at a hidden node outside the transmission power range of the AP1 1, the station STA3 4 is unable to correctly receive the beacon information from the AP1 1, which makes it difficult to associate with the AP1 1.

In other words, since the AP1 is able to receive information from the station STA3 4 but the transmission power of the AP1 is insufficient to reach the station STA3 4, the station STA3 4 does not recognize the AP1 information. Accordingly, it is difficult to establish a communication link between the AP1 and the STA3 4.

Figure 3:
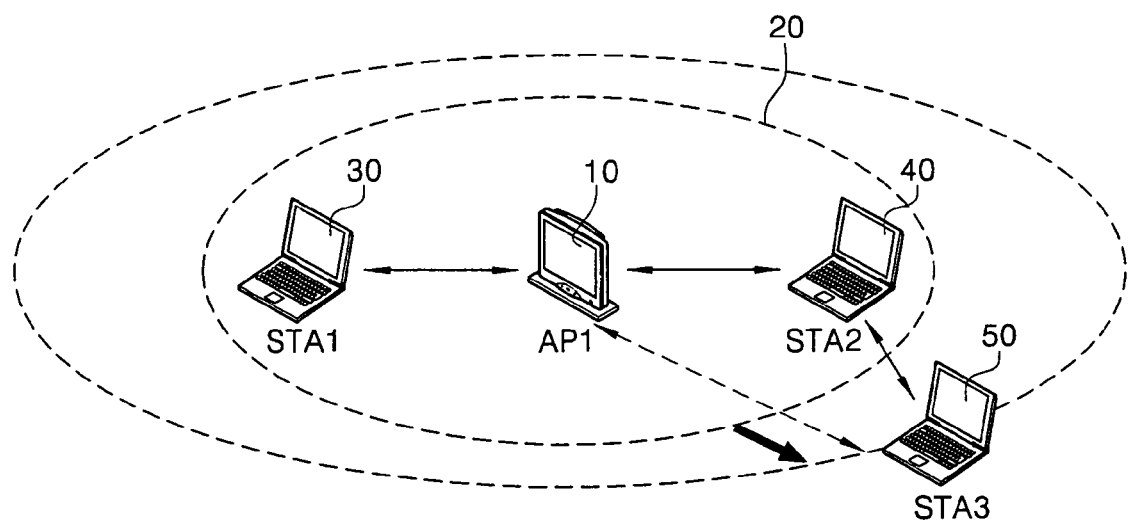
FIG. 3 illustrates a network connection configuration of a system for controlling transmission power in a WLAN according to the present invention.
Figure 4:
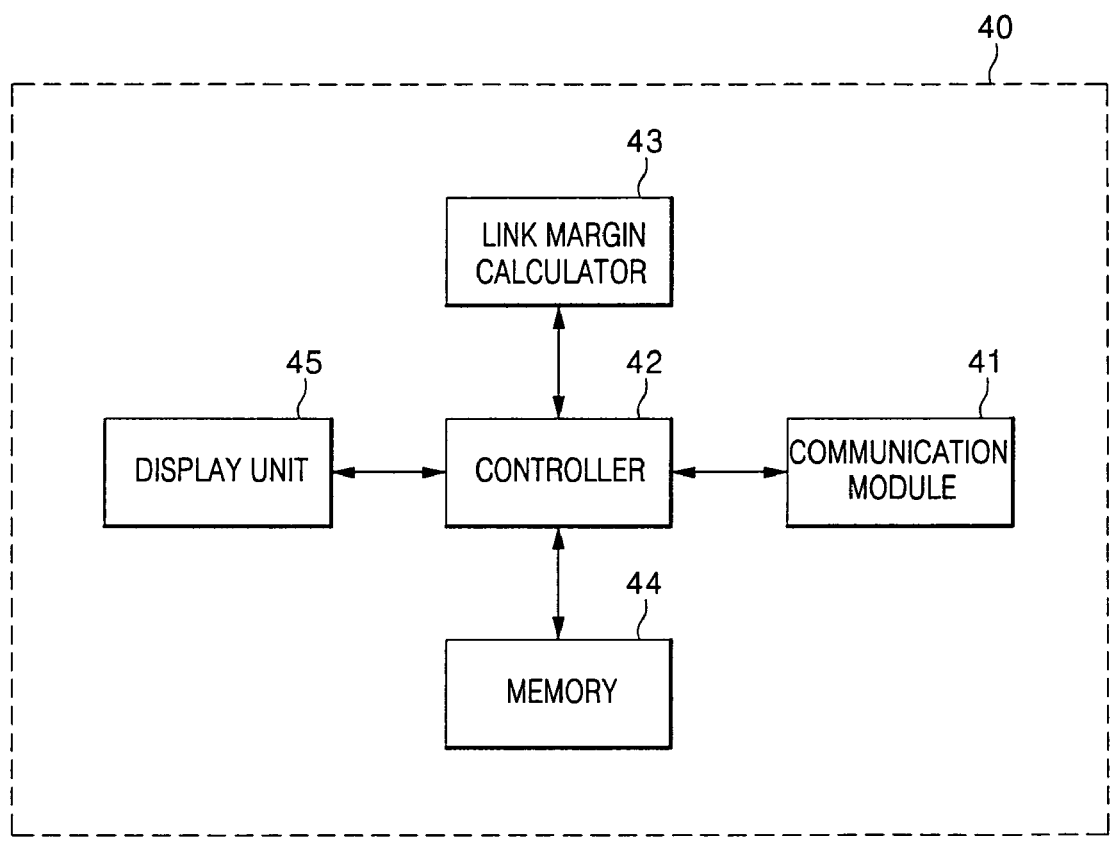
FIG. 4 is a block diagram showing the configuration of a WLAN station according to the present invention.
Figure 6:
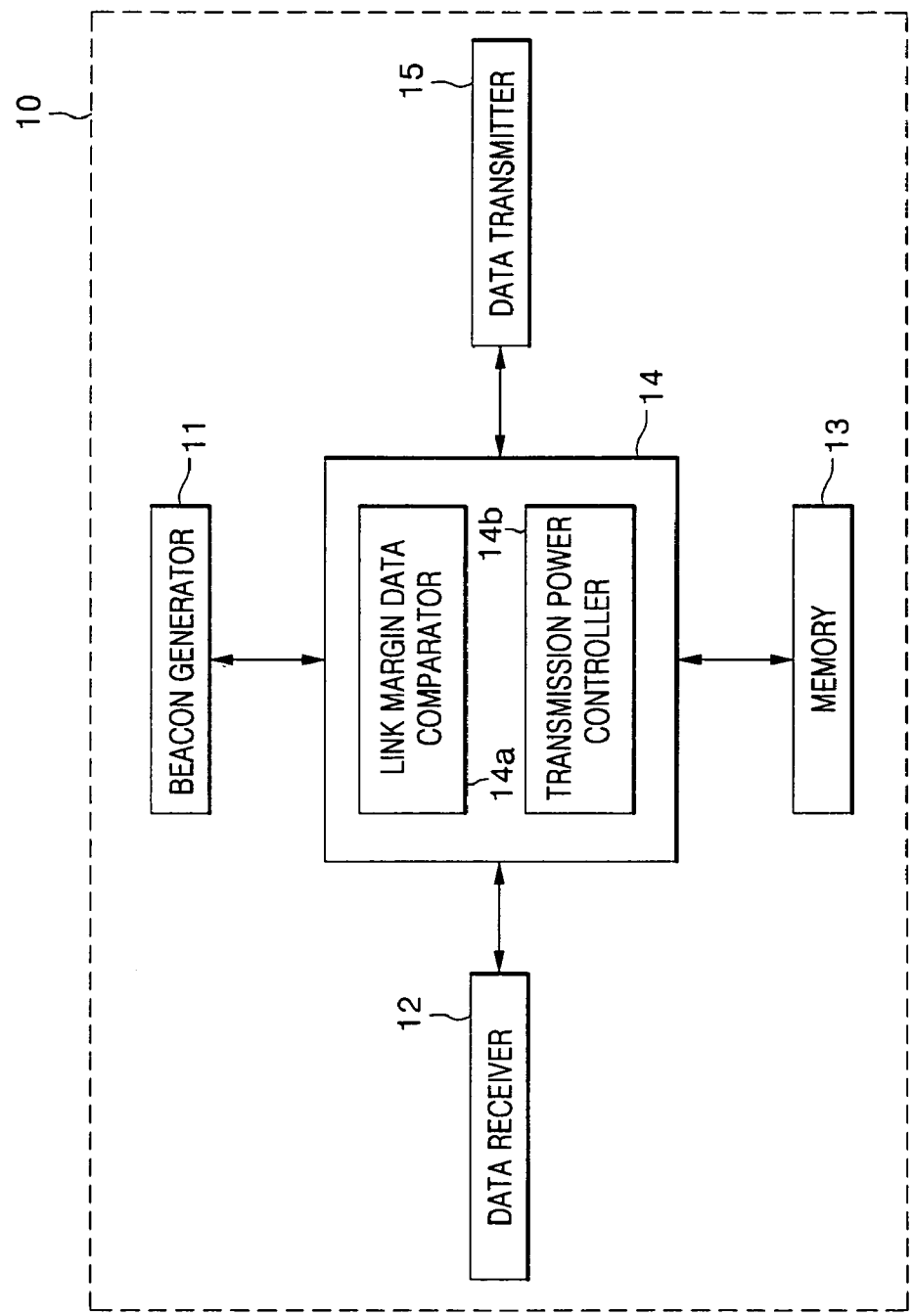
FIG. 6 is a block diagram showing the configuration of an access point according to the present invention.

FIG. 3 illustrates a network connection configuration of a system for controlling transmission power in a WLAN according to the present invention, FIG. 4 is a block diagram showing the configuration of a WLAN station according to the present invention, FIG. 5 illustrates the structure of a TPC start frame according to the present invention, and FIG. 6 is a block diagram showing the configuration of an access point according to the present invention.

As shown in FIG. 3, a WLAN network in an infrastructure mode where the network is built using an access point (AP) according to the present invention is composed of an AP1 10 with transmission power control (TPC) and WLAN stations (STA1, STA2 and STA3) 30, 40 and 50. The first and second stations 30 and 40 are positioned in a BSS (basic service set) service area 20 which is established by the AP1 10 and are able to associate with the AP1 10. The third station 50 is positioned at a hidden node outside the BSS service area 20 and is unable to associate with the AP1 10.

The third station 50 will send an authentication request message to the AP1 10 for association with the AP1 10. However, the third station 50 is unable to receive acknowledgement (ACK) from the AP1 10 and thus is unable to associate with the AP1 10 because the third station 50 is positioned at the hidden node outside the BSS service area 20.

Accordingly, the third station 50 switches its own mode from the infrastructure mode to an ad-hoc (special purpose) mode and then sends a Probe_Request message to all client stations. The Probe_Request message is needed for the third station 50 to discover another client station. In an embodiment of the present invention, the second station 40 positioned closest to the third station 50 receives the Probe_Request message from the third station 50 and sends back an acknowledgement (ACK) message to the third station 50.

Accordingly, the third station 50, which receives the acknowledgement (ACK) message acknowledging the Probe_Request message from the second station 40, sends a beacon message to the second station 40 during a certain time in the ad-hoc mode and then returns to the infrastructure mode.

As shown in FIG. 4, the second station 40 is composed of a communication module 41, a controller 42, a link margin calculator 43, a memory 44, and a display unit 45.

The communication module 41 refers to a general WLAN card and allows the station to associate with the access point (AP1 10) in a relevant service area and to use the WLAN service.

The controller 42 receives a beacon message, in the infrastructure mode, transferred from the AP1 10, and a beacon message, in the ad-hoc mode, transferred from the third station 50, via the communication module 41, and identifies the beacon message in the infrastructure mode and the beacon message in the ad-hoc mode.

Further, the controller 42 sends a TPC_Request message to the first station 30 and receives a TPC_Response message in response to the TPC_Request message. The TPC_Response message contains information on the transmission power of the first station 30 and on a link margin data value when the first station 30 associates with the AP1 10.

The link margin calculator 43 calculates an average receive rate value of the third station 50 from the beacon message in the ad-hoc mode transferred from the third station 50, among the beacon messages identified by the controller 42. The thus calculated average receive rate value is stored in a receive rate information table of the memory 44.

In addition, the link margin calculator 43 calculates a link margin data value of the third station 50 from the calculated average receive rate value of the third station 50 and the link margin data of the current station (e.g. STA2 40). The thus calculated link margin data value is stored in a link margin table of the memory 44.

The controller 42 adds the link margin data of the third station 50, which is calculated by the link margin calculator 43, to a start frame and sends the link margin data to the AP1 10 via the communication module 41.

As shown in FIG. 5, a start frame is composed of a category field indicating spectrum management, an action field indicating a TPC start frame, a dialog token field indicating the number of TPC messages which are transmitted and received between the AP and the station (STA), an element ID field indicating the TPC start frame within the spectrum management format, a length field indicating the size of an entire frame, a transmission power field to which a value of the smallest transmit output (Tx Power) of all stations present in the BSS is input, and a link margin field to which a value of the smallest margin of all the stations present in the BSS is input. Each of the fields has a size of one byte.

In other words, the link margin data of the third station 50 is added to the link margin field of the start frame and is sent to the AP1 10.

The memory 44 stores the calculated average receive rate value and the calculated link margin data value of the third station 50, which are calculated by the link margin calculator 43, in the receive rate information table and the link margin table, respectively.

As shown in FIG. 6, the access point AP1 10 includes a beacon generator 11, a data receiver 12, a memory 13, a controller 14, and a data transmitter 15.

The beacon generator 11 generates a beacon which will be transferred to stations (STAs) positioned in the service area in every beacon period.

The data receiver 12 receives various data from an Ethernet or any station. In particular, the data receiver 12 receives, from the second station 40 positioned in the service area, the start frame information, which contains the calculated link margin data value of the third station 50 positioned at the hidden node, and sends the received start frame information to the controller 14.

The memory 13 stores any data received via the data receiver 12. In particular, reference link margin data set to control the transmission power is stored in the memory 13. The memory 13 stores the start frame information which is transferred from the second station 40.

The controller 14 includes a link margin data comparator 14a for comparing the calculated link margin data value of the third station 50, which is added to the link margin field of the start frame transferred from the data receiver 12, to the reference link margin data value which is pre-stored in the memory 13; and a transmission power controller 14b for compensating the link margin data value of the third station 50 with a preset link margin data value to increase the transmission power (TX power) if it is determined by the link margin data comparator 14a that the calculated link margin data value of the third station 50 is smaller than the reference link margin data value which is pre-stored in the memory 13.

The data transmitter 15 sends to the stations (STAs) the data stored in the memory 13 or the beacon generated by the beacon generator 11, in every beacon time period.

FIG. 7 is a flow diagram illustrating processes of a method for controlling transmission power in a WLAN according to the present invention.

As shown in FIG. 7, the third WLAN station 50, which is positioned at the hidden node outside the BBS service area 20 of the AP1 (access point) 10, among the AP1 10 and the WLAN stations 30, 40 and 50, sends an authentication request message (or an association request message) to the AP1 10 to associate with the AP1 10 (S10).

However, the third station 50 does not receive an acknowledgement (ACK) from the AP1 10 because the third station 50 is positioned at the hidden node outside the BSS service area 20. Thus, the third station 50 is unable to associate with the AP1 10.

Accordingly, the third station 50 switches its own mode from the infrastructure mode to the ad-hoc mode and then sends a Probe_Request message to the access point, e.g. AP1 10, and all of the client stations, e.g. 30 and 40. At this time, in the present invention, the second station 40 closest to the third station 50 receives the Probe_Request message from the third station 50 (S20) and sends an acknowledgment response message ACK to the third station 50 (S30).

Subsequently, the third station 50, which receives the response message responding to the Probe_Request message from the second station 40, sends a beacon message to the second station 40 during a certain time in the ad-hoc mode (S40) and then returns to the infrastructure mode.

The second station 40 then receives a beacon message transferred from the AP1 10 during a certain beacon time period time in the infrastructure mode and the beacon message transferred from the third station 50, discovers the ad-hoc mode beacon message transferred from the third station 50, calculates an average receive rate value of the third station 50 from the discovered beacon message, and stores the calculated average receive rate value in the receive rate information table of memory 44.

The second station 40 then sends a TPC_Request message to the first station 30 (S50). In response thereto, the first station 30 sends a TPC_Response message to the second station 40 (S60). The TPC_Response message contains information on the transmission power of the first station 30, and information on a link margin data value when the first station 30 associates with the AP1 10.

The second station 40 then calculates the link margin data value of the third station 50 by referring to its own link margin data value and the calculated average receive rate value of the third station 50, and stores the calculated link margin data value in the link margin table of memory 44.

The second station 40 then adds the calculated link margin data value of the third station 50 to the start frame to send the calculated link margin data value to the AP1 10 (S70). Here, the calculated link margin data value added to the start frame is the smallest link margin data value of all of the stations.

The AP1 10 then checks the calculated link margin data value in the start frame transferred from the second station 40, and if the calculated link margin data value in the start frame is smaller than the preset reference link margin data value, increases the transmission power (TX power) by the preset reference link margin data value.

Accordingly, the third station 50 positioned at the hidden node becomes able to receive the beacon message transferred from the AP1 10 in the infrastructure mode and thus can associate with the AP1 10 (S80).

While the present invention has been particularly shown and described with reference to preferred embodiments thereof, it will be understood by those skilled in the art that various changes in form and details may be made therein without departing from the spirit and scope of the invention as defined by the appended claims.

According to the present invention, it is possible for even a station positioned at the hidden node to smoothly use a WLAN service as the service area of the AP is extended by efficiently controlling the transmission power of the AP based on link margin information of stations. In addition, power loss in the AP can be minimized

What is claimed is:

1. A system for controlling transmission power in a wireless local area network (WLAN), comprising:
    an access point having a transmission power controller,
    a first station and a second station each positioned in a service area of the access point, said access point receiving from said second station calculated link margin data of a third station positioned at a hidden node of the WLAN, when said second station is closer than said first station to said third station, said access point comparing the received calculated link margin data to preset link margin data to control the transmission power in the WLAN,
    the third station transmitting an authentication request to said access point and switching its mode from an infrastructure mode to an ad-hoc mode to send a beacon to the second station when said third station fails to receive an acknowledgment said access point,
    said second station, upon receipt of said beacon, calculating an average receive rate value of the third station and then calculating the calculated link margin data of the third station from its own link margin data and said average receive rate information and transmitting the calculated link margin data to the access point,
    said access point increasing power transmission to establish communications with the third station based on the calculated link margin data received.

2. The system according to claim 1, wherein the access point comprises:
    a link margin data comparator for comparing the calculated link margin data of the third station to the preset link margin data; and
    said transmission power controller compensating a value of the calculated link margin data of the third station with a value of the preset link margin data to increase the transmission power if the calculated link margin data value of the third station is smaller than the preset link margin data value.

3. The system according to claim 1, wherein the second station adds the calculated link margin data of the third station to a start frame to send the calculated link margin data with said start frame to the access point.

4. A method for controlling transmission power of an access point in a wireless local area network (WLAN), comprising steps of:
    switching a mode of a first station, positioned outside a service area of the access point, from an infrastructure mode to an ad-hoc mode and transmitting a beacon during a certain time, when the first station fails to associate with the access point;
    receiving, by a second station positioned in said service area, the beacon transferred from the first station, to calculate link margin data of the first station;
    calculating an average receive rate value in response to the beacon received from the first station;
    calculating the calculated link margin data of the first station in response to its own link margin data and the average receive rate value;
    receiving, by the access point, the calculated link margin data of the first station from the second station, and comparing the calculated link margin data to preset link margin data to determine the transmission power from its own link margin data and average receive rate information calculated upon discovery of said beacon transferred from the wireless station; and
    compensating the value of the calculated link margin data of the first station with the preset link margin data to increase the transmission power of the access point when the calculated link margin data of the first station is smaller than the preset link margin data.

5. The method according to claim 4, wherein the second station adds the calculated link margin data of the first station to a start frame and sends the start frame to the access point.

* * * * *